United States Patent

Sugitani

Patent Number: 5,526,019
Date of Patent: Jun. 11, 1996

[54] CHARACTER PROCESSING APPARATUS

[75] Inventor: Kazunori Sugitani, Tokyo, Japan

[73] Assignee: Canon Kabushiki Kaisha, Tokyo, Japan

[21] Appl. No.: 347,181

[22] Filed: Nov. 22, 1994

Related U.S. Application Data

[63] Continuation of Ser. No. 47,610, Apr. 8, 1993, abandoned, which is a continuation of Ser. No. 749,519, Aug. 19, 1991, abandoned, which is a continuation of Ser. No. 282,971, Nov. 28, 1988, abandoned, which is a continuation of Ser. No. 946,094, Dec. 23, 1986, abandoned, which is a continuation of Ser. No. 831,044, Feb. 12, 1986, abandoned, which is a continuation of Ser. No. 396,081, Jul. 7, 1982, abandoned.

[30] Foreign Application Priority Data

Jul. 15, 1981 [JP] Japan ................... 56-109289

[51] Int. Cl.$^6$ .................................... G09G 5/36
[52] U.S. Cl. ............... 345/140; 345/24; 345/133; 345/141
[58] Field of Search ................... 345/156, 168, 345/35, 24, 133, 140, 141; 364/582

[56] References Cited

U.S. PATENT DOCUMENTS

| | | | |
|---|---|---|---|
| 3,343,030 | 9/1967 | Dragon et al. | 340/722 X |
| 3,375,509 | 3/1968 | Mullarkey | 340/722 X |
| 3,487,308 | 12/1969 | Johnson | 340/722 X |
| 3,678,498 | 7/1972 | Nagamatsu et al. | 340/722 |
| 3,778,811 | 12/1973 | Gicca et al. | 340/722 |
| 4,001,807 | 1/1977 | Dallimonti | 340/717 |
| 4,251,816 | 2/1981 | Eppley | 340/722 X |
| 4,283,723 | 8/1981 | Bickley et al. | 340/723 X |
| 4,296,476 | 10/1981 | Mayer et al. | 340/723 X |
| 4,298,957 | 11/1981 | Duvall et al. | 340/790 X |
| 4,303,973 | 12/1981 | Williamson, Jr. et al. | 340/722 |
| 4,447,888 | 5/1984 | Kuecker et al. | 340/723 X |

Primary Examiner—Ulysses Weldon
Assistant Examiner—Matthew Luu
Attorney, Agent, or Firm—Fitzpatrick, Cella, Harper & Scinto

[57] ABSTRACT

A character/pattern processing apparatus has conversion means for converting numerals related to characters stored in a memory to magnitude information proportional to values of the numerals and display means for displaying the magnitude information on a display device. Items represented by the characters and graphs which represent the numeric values related to the respective items are displayed without formatting the graphs.

5 Claims, 8 Drawing Sheets

FIG. I

|   | RAM |
|---|---|
| 221 | 110 (2) |
| 222 | 80 (2) |
| 223 | 200 (2) |
| 224 | 150 (2) |
| 225 |  |
| 226 |  |
| 227 |  |
| 228 |  |
| 229 |  |
| 230 |  |
| 231 | 200 (2) |
FIG. 8 (a)
|   | RAM |
|---|---|
| 221 | 55 (2) |
| 222 | 40 (2) |
| 223 | 100 (2) |
| 224 | 75 (2) |
| 225 |  |
| 226 |  |
| 227 |  |
| 228 |  |
| 229 |  |
| 230 |  |
FIG. 8 (b)
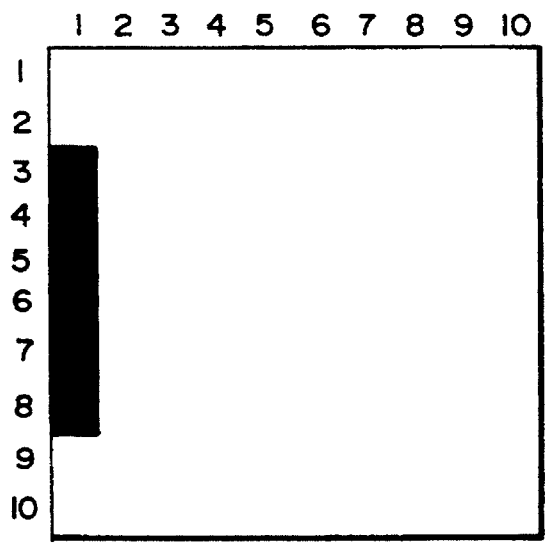
FIG. 9 (a)
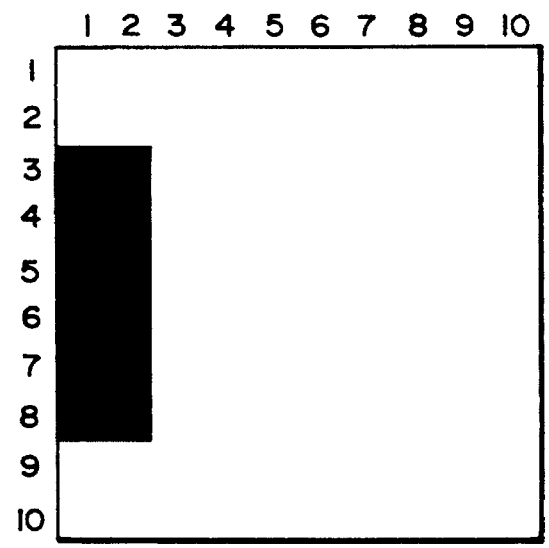
FIG. 9 (b)

5,526,019

CHARACTER PROCESSING APPARATUS

This application is a continuation of application Ser. No. 08/047,610 filed Apr. 8, 1993, now abandoned, which is a continuation application of application Ser. No. 07/749,519 filed Aug. 19, 1991, now abandoned, which is a continuation application of Ser. No. 07/282,971 filed Nov. 28, 1988, now abandoned, which is a continuation application of Ser. No. 06/946,094 filed Dec. 23, 1986, now abandoned, which is a continuation application of Ser. No. 06/831,044 filed Feb. 12, 1986, now abandoned, which is a continuation application of Ser. No. 06/396,081 filed Jul. 7, 1982, now abandoned.

BACKGROUND OF THE INVENTION

1. Field of the Invention

The present invention relates to a character/pattern processing apparatus for processing characters and patterns, and more particularly to a character/pattern processing apparatus capable of preparing a graph based on characters entered from a keyboard.

2. Description of the Prior Art

In a prior art character/pattern processing apparatus of this type, an area for preparing a graph is previously reserved and items and numerals to be displayed on the graph must be formatted, for example, as a vertical or horizontal line.

SUMMARY OF THE INVENTION

It is an object of the present invention to provide a character/pattern processing apparatus capable of displaying an automatically formatted graph by serially inputting items and numerals without formatting and using instruction means for graphing.

In order to achieve the above object, the present invention is characterized by the provision of input means for inputting characters, a memory for storing the characters inputted by the input means, means for displaying the characters stored in the memory, display means for displaying numerals in the characters as graphs which are proportional in size to the magnitude of the numeric values and display instruction means for instructing a display format to the display means.

In accordance with another feature of the present invention, there is provided a data processing apparatus having memory means for storing characters and numerals related to the characters, conversion means connected to the memory means for converting the numeric values related to the characters stored in the memory means to information proportional to the magnitude of the numeric values and visualizing means connected to the conversion means for visualizing the information converted by the conversion means.

It is another object of the present invention to provide a character processing apparatus for serially arranging, on a two-dimensional plane, data comprising characters and numerals entered from input means.

It is other object of the present invention to provide a character processing apparatus for separately rearranging a set of characters and numerals stored in memory means.

The above and other objects of the present invention will be apparent from the following description of the present invention.

BRIEF DESCRIPTION OF THE DRAWINGS

FIGS. 6(a) to 8(b) illustrate contents of a data buffer and a RAM, and FIGS. 9(a) and 9(b) illustrate dot patterns which form graphs.

DESCRIPTION OF THE PREFERRED EMBODIMENTS

Figure 1:
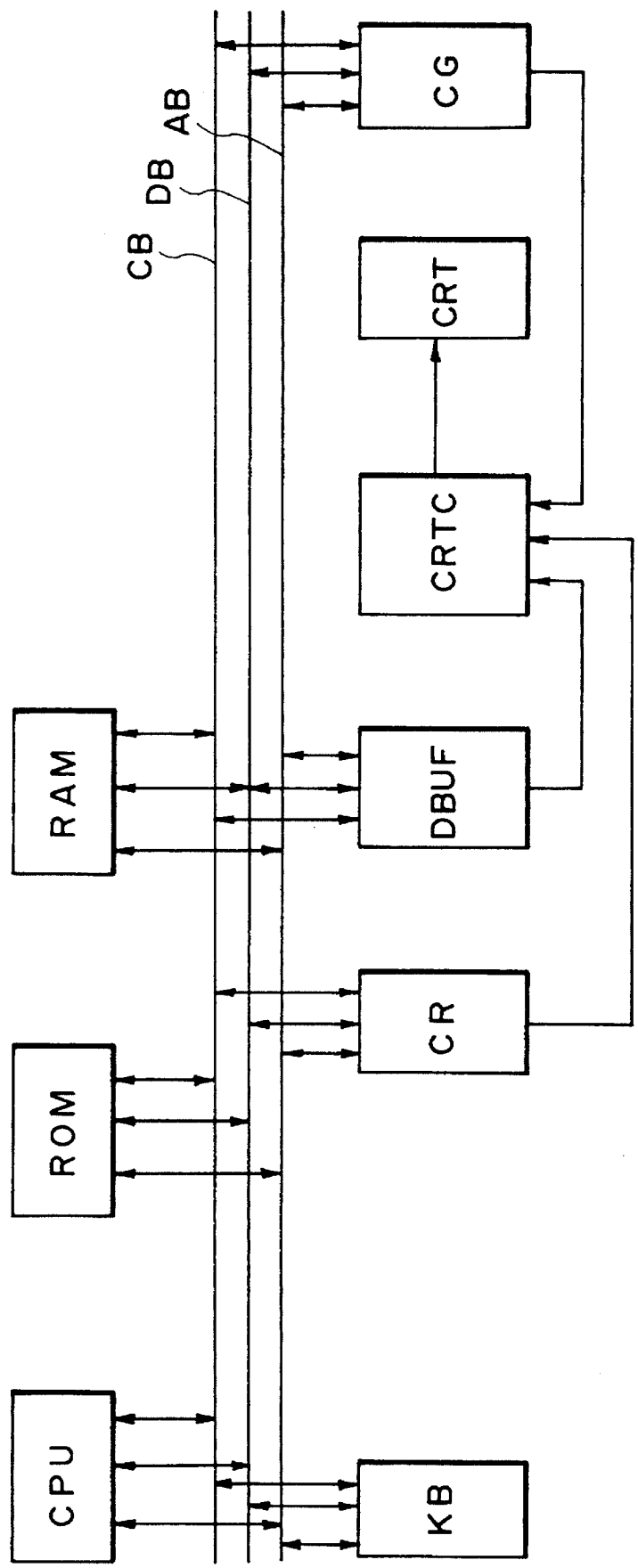
FIG. 1 shows a block diagram of one embodiment of the present invention.

FIG. 1 shows one embodiment of a character/pattern processing apparatus of the present invention.

In FIG. 1, CPU denotes a microprocessor which carries out arithmetic and logic operations to process characters and controls units connected to an address bus AB, a control bus CB and a data bus DB through those buses.

The address bus AB transfers an address signal which designates a unit to be controlled by the microprocessor CPU. The control bus CB transfers control signals to the units to be controlled by the microprocessor CPU. The data bus DB transfers data among the units.

Figure 2:
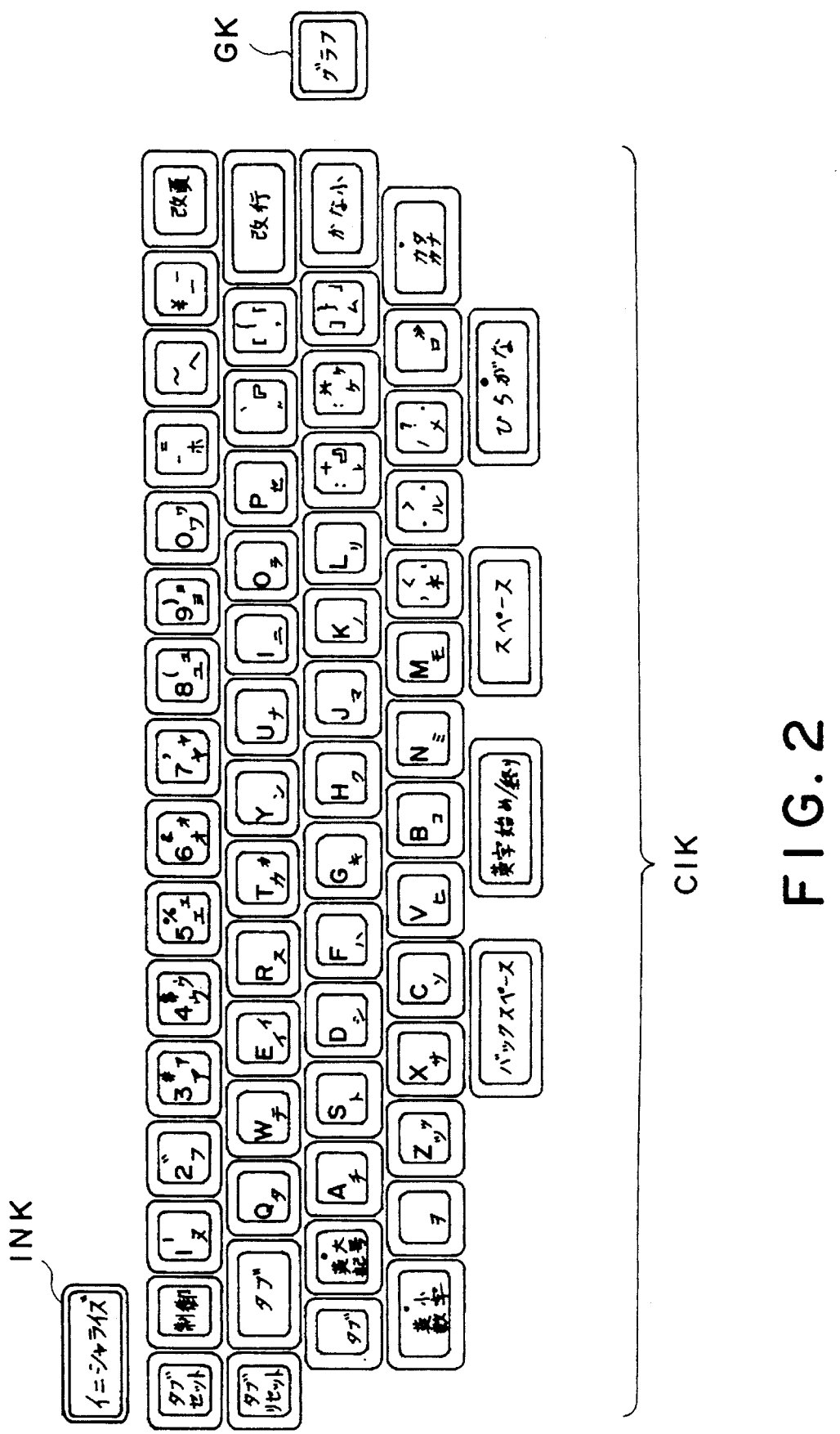
FIG. 2 shows a detail of an arrangement of a keyboard KB shown in FIG. 1.
Figure 4:
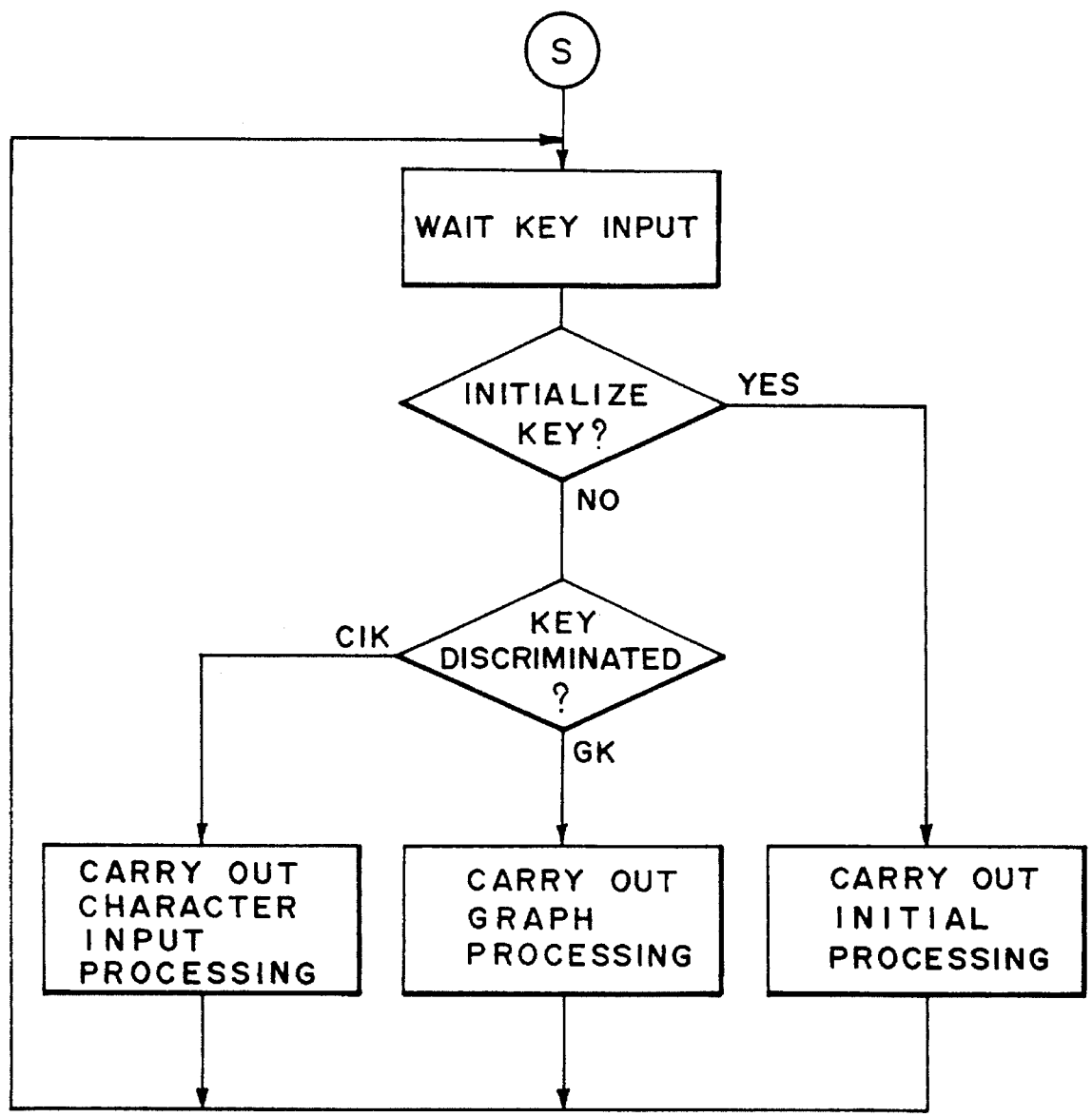
FIGS. 4 and 5 show flow charts of processing in accordance with the present invention.
Figure 5:
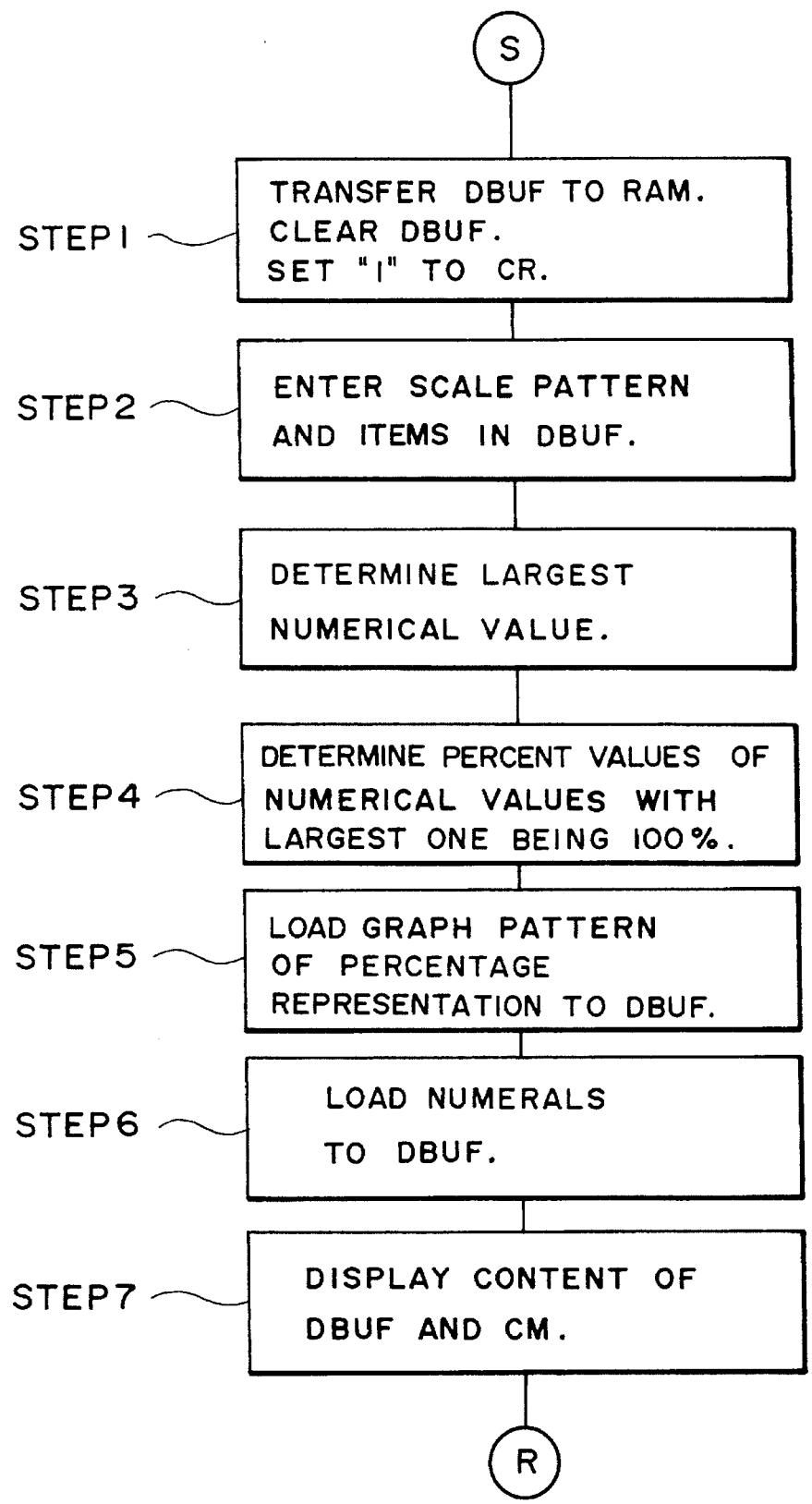

ROM denotes a read-only fixed memory which stores control sequences of the microprocessor CPU as shown in FIGS. 4 and 5. RAM denotes a 16-bit word organized writable random access memory which is used to temporarily store data from the units. KB denotes a keyboard having keys for inputting data and instructions to the character processing apparatus arranged as shown in FIG. 2. Referring to FIG. 2, CIK denotes a group of keys including character keys and function keys for processing characters, INK denotes an initialization key for initializing the apparatus, and. GK denotes a graph key for instructing a graphic display.

Referring again to FIG. 1, CR denotes a cursor register which reads and writes data relating to a cursor position under the control of the microprocessor CPU. Under the control of a CRT controller CRTC, a cursor is moved to a display position on a CRT display screen corresponding to an address stored in the cursor register CR. Information stored in the cursor register CR is one of serial numbers 1–220, and the CRT controller CRTC converts the serial number to a row number and a column number to display the cursor.

DBUF denotes a data buffer which stores sentence information entered from the keyboard KB. Information stored therein by the CRT controller CRTC is displayed on a display device CRT. The data buffer DBUF is used as a refresh memory for the display device CRT and it is read and written into by the microprocessor CPU. The data buffer DBUF has a capacity of 20×11 w (w: word, one word=one character) and a content thereof is displayed on the display device CRT. Characters are displayed by 20 characters in a horizontal row and in 11 vertical columns, and they correspond, in sequence, to the 220-word content of the data buffer DBUF. Data stored in the data buffer DBUF are sequentially numbered from 1 to 220, A first data is represented by DBUF (1), a second data is represented by DBUF (2) and N-th data is represented by DBUF (N).

The CRT controller CRTC controls the display of the cursor and the display pattern on the display screen of the display device CRT in accordance with the cursor position and character/symbol code signals stored in the cursor register CR and the data buffer DBUF.

CRT denotes the display device which uses a CRT. The display of the dot display pattern and the cursor in the display device CRT are controlled by the CRT controller CRTC. CG denotes a charactor generator which generates character signals for the characters, symbols and cursor to be displayed on the display device CRT. Each of the characters and symbols comprises 10×10 dots.

The operation of the present character/pattern processing apparatus thus constructed is now explained with reference to FIGS. 3(a) and 3(b). All manipulations are effected by the character keys and the function keys on the keyboard KB. When power is turned on, only the cursor CM is displayed at a top left start position on the display screen of the display device CRT. When the initialization key INK is then depressed, all conditions are initialized so that the functions of the present apparatus are ready to operate.

By depressing the initialization key INK, the cursor CM is positioned at the first column on the topmost row on the display screen of the display device CRT so that the entry of the characters from the keyboard KB is allowed. The character entered from the-keyboard KB is displayed at the position on the display device CRT at which the cursor CM is displayed. The cursor CM is shifted one position for each entry of a character from the keyboard KB. The input/output control thus far described can be attained by a conventional technique.

In the present invention, items and numerals are entered from the keyboard KB. Since the items may include numerals, the items and the numerals are delimited by commas using a comma key. It is assumed that the number of characters permitted to an item is five, the number of digits permitted to a numeral is four and the number of items is ten. After the items and the numerals have been entered, the graph key GK is depressed. Then, the previous display is cleared and a scale is displayed on the first row and the items, graphs and numerals are displayed on the subsequent rows, one item on one row.

Figure 3A:
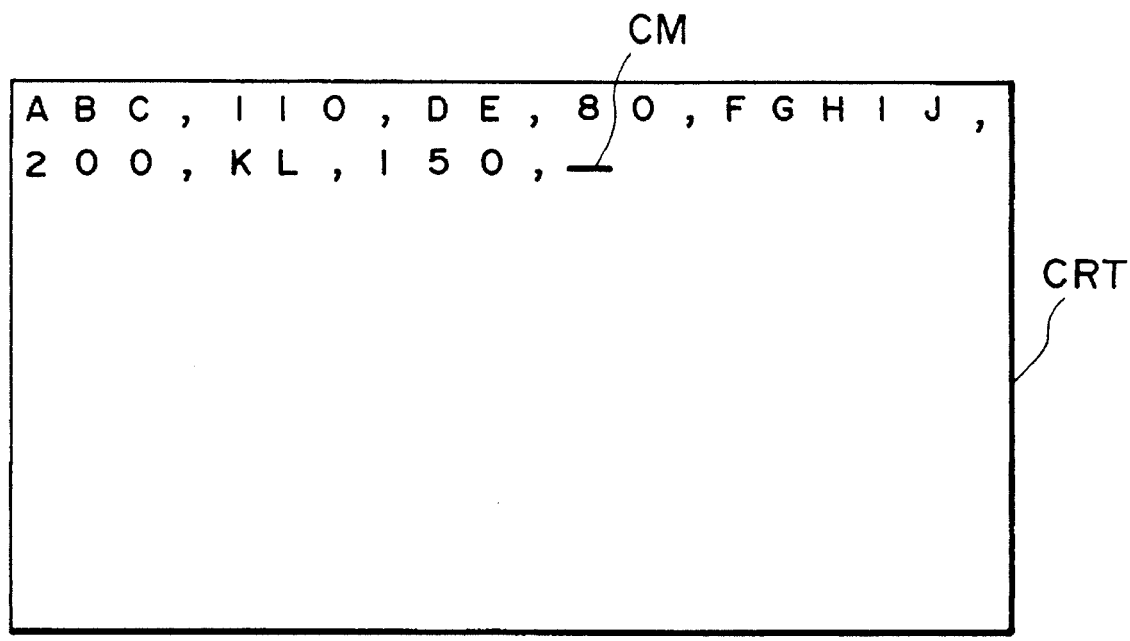
FIG. 3(a) illustrates a display format of an input character sequence.
Figure 3B:
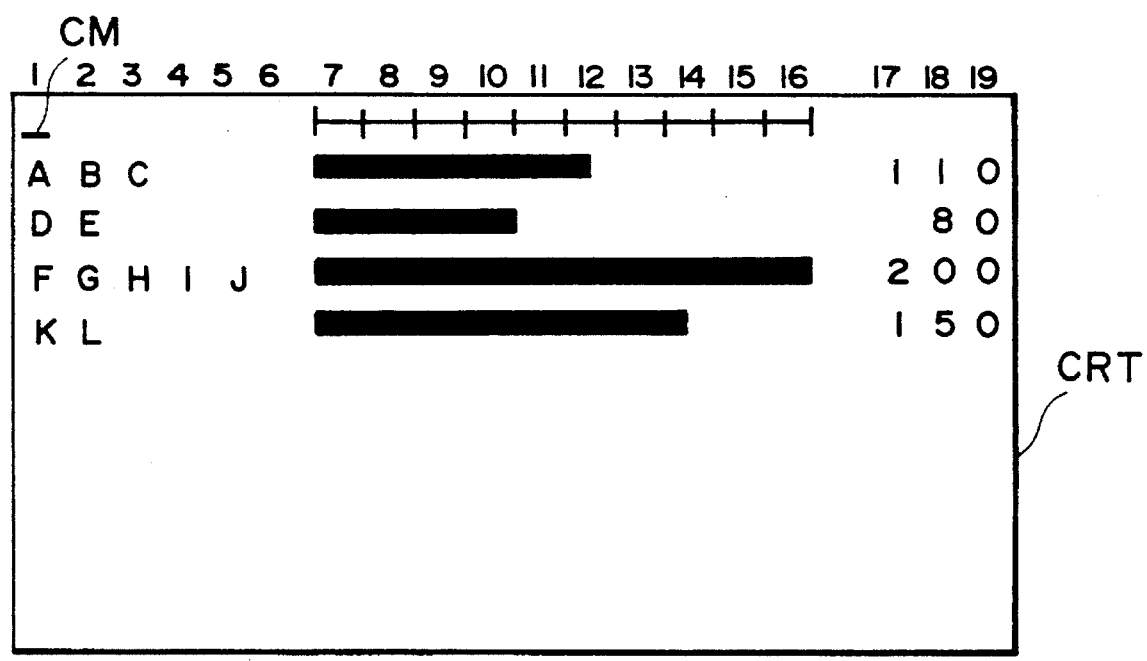
FIG. 3(b) illustrate a display format of a graphic display.

For example, let us assume that combinations of items and related numerals as shown in the CRT display screen of FIG. 3(a) have been entered. ABC, DE, FGHIJ and KL represent the items and numeric values 110, 80, 200 and 150 are related thereto, respectively. When the graph key GK is depressed in this state, a 10-character scale is displayed on the first row, and the items, graphs and numerals are sequentially displayed on the subsequent rows, as shown in FIG. 3(b). The graphs are displayed after a percentage calculation such that the graph for the largest one of the input numeric values is displayed to the length of ten characters. The cursor CM is displayed at the leftmost start position on the CRT screen.

The operation of the present apparatus is further explained with reference to flow charts of FIGS. 4 and 5.

When a key on the keyboard KB is depressed, the microprocessor CPU checks if it is the initialization key INK, and if the decision is yes, the initialization processing is carried out. If the decision is no, the microprocessor CPU further checks if it is the graph key GK or other character input key CIK. If it is the graph key GK, the graph processing is carried out, and if it is the character input key CIK, the character input processing is carried out. After either of these processings, the microprocessor CPU waits for a next key input.

Details of the respective processings are explained below.

The initializing processing has a function to of clearing the entire content of the data buffer DBUF, setting "1" to the cursor register CR and displaying only the cursor CM at the left end on the top row on the CRT display screen. When it is desired to reenter data from the beginning, the initialization key INK may be depressed so that the screen is cleared.

The character input processing has a function of storing the code of the input key from the keyboard KB at an address of the data buffer DBUF(CR) corresponding to the position of the cursor CM, incrementing the content of the cursor register CR by one and displaying the content of the data buffer DBUF and the cursor CM on the CRT display screen.

Figures 6A, 6B:
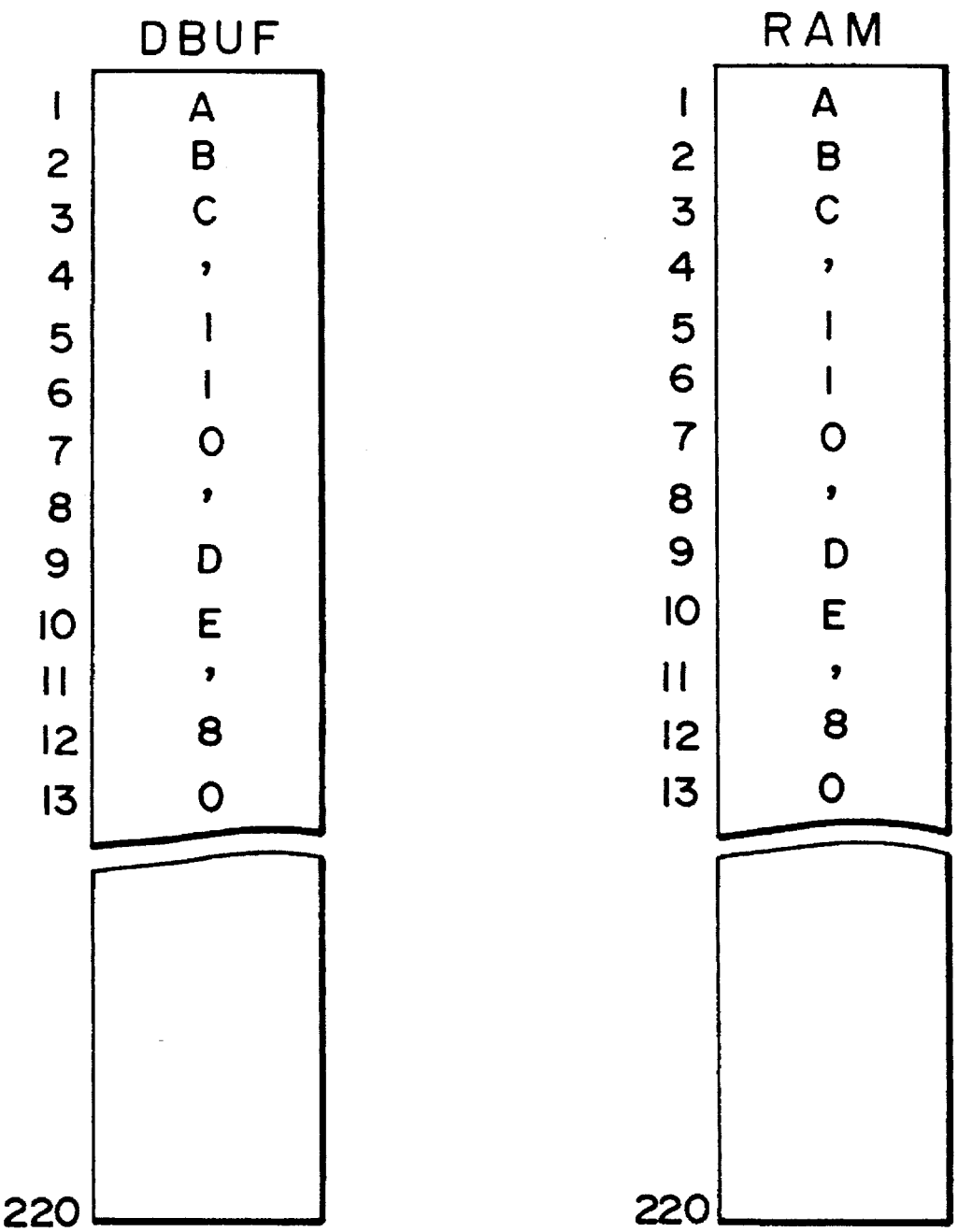
Figures 7A, 7B, 7C, 7D:
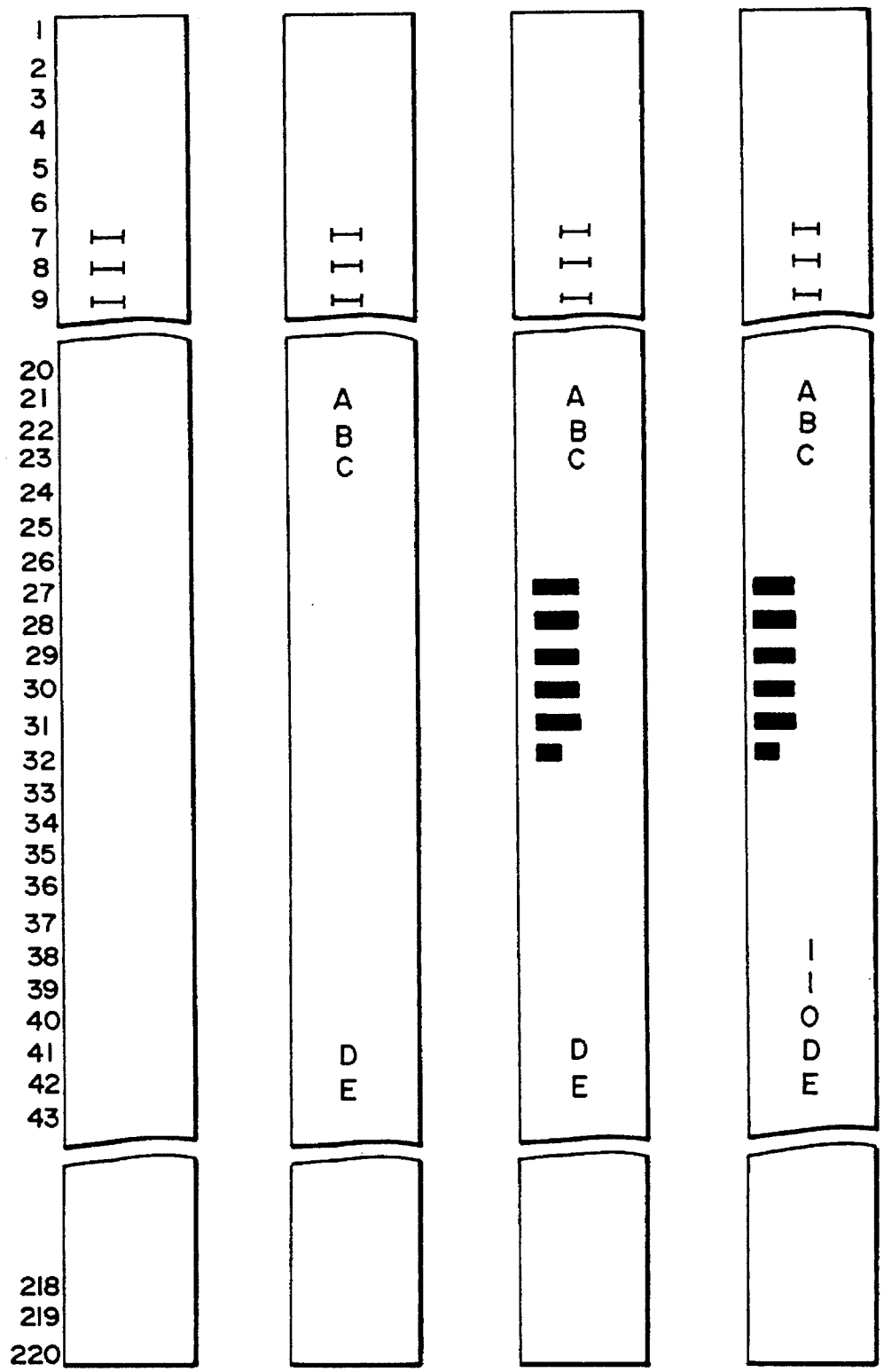

The graph processing is explained with reference to FIG. 5. The processing comprises seven major steps.
Step 1:
The entire 220-word content of the data buffer DBUF is transferred to the writable memory RAM. This is shown in FIGS. 6(a) and 6(b). After the transfer, the entire content of the data buffer is cleared. "1" is set to the cursor register CR.
Step 2:
A code of a symbol pattern used as a scale is loaded to the data buffer DBUF (7)–DBUF (16), as shown in FIG. 7(a). The item data are read from the random access memory RAM and loaded to the predetermined positions of the data buffer DBUF.

The content of the random access memory RAM is shown in FIG. 6 (b). A character sequence "ABC" before the first comma "," is the first item, which is transferred to the data buffer DBUF (21)–DBUF (23). A character sequence "DE" before the third comma "," is the second item, which is transferred to the data buffer DBUF (41)–DBUF (42). Similarly, the N-th item is transferred to the data buffer DBUF (20 n+1). This is shown in FIG. 7(b).
Step 3:
The numeric data stored in the random access memory RAM are not numerals per se but the codes corresponding to the numerals. Accordingly, those codes are converted to binary numbers and transferred to another area of the random access memory RAM as shown in FIG. 8(a). (In FIGS. 8(a) and 8(b), numerals in the parentheses( ) indicate notations.) The largest one of the numeric values is determined and it is loaded at an address, e.g., address 231, of the random access memory RAM.
Step 4:
Percent values of the numeric values are determined with the largest numeric value being 100 percent, and they are reloaded to the same area of the random access memory RAM as shown in. FIG. 8(b). The percent values are determined by multiplying the numeric values by 100 and dividing the products by the largest numeric value, in the present example, 200 stored at the address 231 of the random access memory RAM. Residues are thrown away.
Step 5:
Since the respective numeric values are represented by percentage values with the largest numeric value being 100 percent as shown in FIG. 8(b), the values are no larger than 100. On the other hand, the display range of the CRT screen for displaying the graph is of 10-character width. Accordingly, at least ten patterns are needed to graphically display the numerals 0–100. Each dot pattern of the character generator CG has a 10×10-dot font. Thus, by setting ten graphic dot patterns at one-dot pitch in the character generator CG, 0 to 100 graphic patterns can be formed by the combination of those patterns. FIGS. 9(a) and 9(b) show examples of graph patterns for 1 (one column) and 2 (two columns), respectively. When graph patterns-for 3, 4, . . . , 10 are displayed, codes GP1, GP2, . . . , GP10 are added to the respective graph patterns.

Since the first one of the numeric values listed in FIG. 8(b) is "55", the graph pattern corresponding to the numeric value "55" is displayed on the CRT display screen by the combination of five graph patterns GP10 and one graph pattern GP5. When the numeric value is divided by 10 resulting in an integer quotient plus a residue n, the quotient is the number of graph patterns GP10. The overall graph is therefore depicted by the combination of as many graph patterns GP10 as the quotient and one graph pattern GPn. The codes of the graph patterns for the respective numerals are loaded to the data buffer DBUF such that they are displayed starting from the seventh column on the CRT display screen. The graph pattern codes are displayed starting at the seventh column because the first to sixth columns are used to display the items. In the present embodiment, the codes of the graph patterns GP are loaded to the data buffers DBUF (2m +7) (m=1–10). This is illustrated in FIG. 7(c). The graph pattern codes are displayed on every even-numbered line (2 m+7) in order to keep the odd-numbered lines blank to facilitate the separation of the graphs.

Step 6:

In order to display the numerals, numeral codes are loaded to the positions of the data buffer DBUF corresponding to the end positions of the respective lines on the display screen. As shown in FIG. 6(b), the numeric values 110, 80, ... are stored in the random access memory RAM before the evennumbered commas "," These numeric values are retroactively loaded, the last digit first, in the data buffers DBUF (20(m+1)) (m=1–10). The result is shown in FIG. 7(d).

Thus, the loading to the data buffer DBUF is completed.

Step 7:

The content of the data buffer DBUF and the cursor CM are displayed on the screen.

While the 10×10 dot character patterns are used for the character generator CG in the above embodiment, other configurations, for example, 20×20 dot pattern may be used. In this case, the graph pitch is 1/200 and finer graphic display can be presented. While the number of characters on the display screen is 11 rows×20 columns in the illustrated embodiment, other configuration, for example, 21 rows×40 columns may be used. In this case, the number of items is increased to twenty and the number of characters of the item may be larger than five. While the number of digits of the numeral is limited to four in the illustrated embodiment, more digits may be set. While bar graphs are shown, a segment graph may be used.

As described hereinabove, according to the present invention, the graph need not be formatted in graphically displaying the numeric information and hence the graph display is facilitated.

While the graph key is depressed to carry out the graph processing in the illustrated embodiment, a graph processing symbol may be displayed on the CRT screen and the cursor CM is moved to the symbol position to enter the symbol to the apparatus. While the CRT is shown, the result of the graph processing may be printed out by a printer.

I claim:

1. A graph forming apparatus comprising:

input means for manually entering names and numeric values of a plurality of items and segmentation data for segmenting each of the names and the numeric values;

memory means for storing the names and the numeric values of the plurality of item and the segmentation data manually entered by said input means;

display means for displaying the names and the numeric values of the plurality of items and the segmentation data stored in said memory means;

instructing means for instructing the formation of a graph comprising the names and graph data representing the numeric values of the plurality of items, when the names of the plurality of items are displayed at first positions and the numeric values of the plurality of items are displayed at second positions on said display means;

identification means for identifying the name and numeric value of each of the items based on the arrangements of the names at the first positions and the numeric value at the second positions and the segmentation data displayed on said display means when said instruction means instructs the formation of the graph;

generating means for generating the graph data of each of the items from corresponding numeric values identified by said identification means;

determination means for determining third positions at which the graph data generated by said generating means is to be displayed on the graph, based on an order of appearance of corresponding numeric values in the second positions and determining fourth positions for rearranging the names of the plurality of items on the graph, based on the order of appearance of the names in the first positions; and graph forming means for forming the graph on said display means, where the graph data and the names of items are displayed at the third and fourth positions determined by said determination means, respectively.

2. A graph forming apparatus according to claim 1, further comprising means for distinguishing an inputted name from an inputted numeric value.

3. A graph forming apparatus according to claim 1, wherein said generating means further comprises means for calculating a size of graph data proportional to the magnitude of each numeric value on the basis of the maximum value of said numeric value.

4. A graph forming apparatus according to claim 1, further comprising:

second determination means for determining fifth positions of the numeric values of the plurality of items on the graph, where the numeric values correspond to the graph data representing the numeric values on the graph, respectively, and display control means for controlling said display means to display the numeral values at the fifth positions determined by said second determination means.

5. A method for forming a graph comprising the steps of:

entering names and numeric values of a plurality of items and segmentation data for segmenting each of the names and the numeric values, by means of a plurality of keys;

storing the entered names and the numeric values of the plurality of items and the segmentation data;

displaying the stored names of the items at first positions and the numeric values at second positions;

instructing the formation of a graph comprising the names and graph data representing the numeric values of the plurality of items when the names of the plurality of items are displayed at the first positions and the numeric values of the plurality of items are displayed at the second positions;

identifying the name and numeric value of each of the items based on the arrangements of the names at the first positions and the numeric value at the second positions and the segmentation data displayed on said display means when the formation of the graph is instructed;

generating the graph data of each of the items from corresponding identified numeric values;

determining third positions at which the generated graph data is to be displayed on the graphs based on an order of appearance of corresponding numeric values in the second positions and determining fourth positions for rearranging the names of plurality of items on the graph, the first positions of the plurality of items when the formation of the graph is instructed in said instructing step, where the display positions of the plurality of graph data correspond to the third positions of the plurality of based on an order of appearance of the names in the first positions; and forming the graph on which the graph data are displayed at the determined third positions and the names of the plurality of items are displayed at the determined fourth positions.

* * * * *

UNITED STATES PATENT AND TRADEMARK OFFICE
CERTIFICATE OF CORRECTION

PATENT NO. : 5,526,019
DATED : June 11, 1996
INVENTOR(S) : KAZUNORI SUGITANI

It is certified that error appears in the above-indentified patent and that said Letters Patent is hereby corrected as shown below:

COLUMN 1

Line 57, "other" should read --another--.

COLUMN 2

Line 5, "illustrate" should read --illustrates--.

Line 38, "and." should read --and--.

COLUMN 4

Line 1, "to" should be deleted.

Line 65, "patterns-for" should read --patterns for----.

COLUMN 5

Line 26, "evennumbered" should read --even-numbered--, and "","" should read --",".--.

Line 31, "content" should read --contents--.

Line 39, "configuration," should read --configurations,--.

Line 62, "item" should read --items--.

UNITED STATES PATENT AND TRADEMARK OFFICE
CERTIFICATE OF CORRECTION

PATENT NO. : 5,526,019
DATED : June 11, 1996
INVENTOR(S) : KAZUNORI SUGITANI

It is certified that error appears in the above-indentified patent and that said Letters Patent is hereby corrected as shown below:

COLUMN 6

Line 46, "numeral" should read --numeric--.

COLUMN 7

Line 6, "graphs" should read --graph,--.
Line 9, "plurality" should read --the plurality--.
Line 10, "the first positions of the plurality of items when" should be deleted.
Line 11, should be deleted.

COLUMN 8

Lines 1 and 2 should be deleted.
Line 3, "plurality of" should be deleted.

Signed and Sealed this

Twenty-ninth Day of October 1996

*Attest:*

BRUCE LEHMAN

*Attesting Officer*     *Commissioner of Patents and Trademarks*